May 3, 1927.
L. PARR
1,626,751
MACHINE FOR STRAIGHTENING SAWS
Filed April 10, 1925
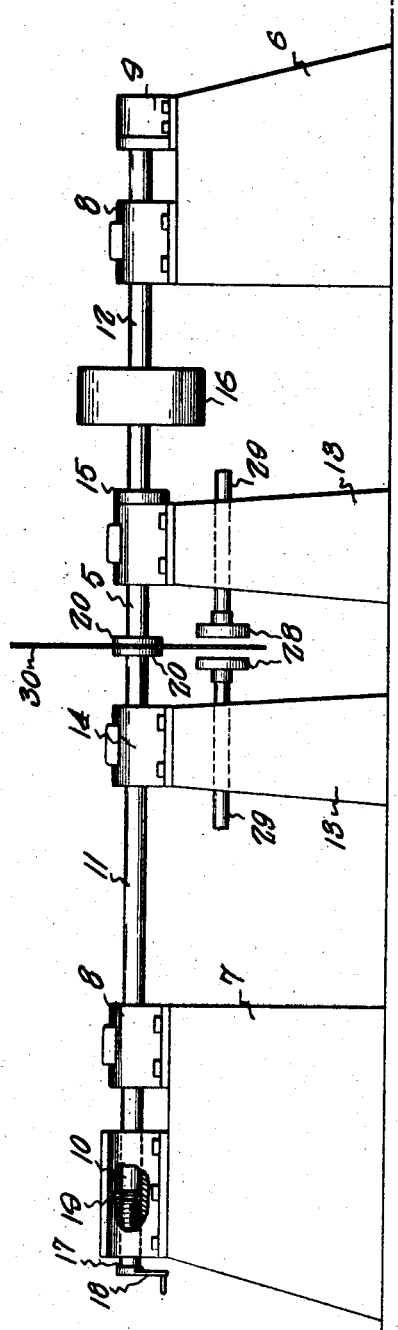
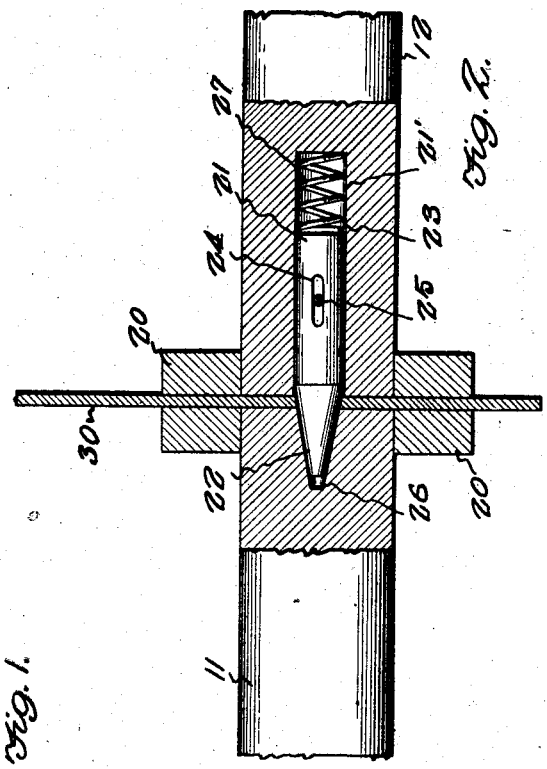
Louis Parr, Inventor
Witnesses
C. E. Churchman Jr.
E. A. Blosk.
By Richard B. Owen, Attorney Patented May 3, 1927.

1,626,751

UNITED STATES PATENT OFFICE.

LOUIS PARR, OF VANCOUVER, BRITISH COLUMBIA, CANADA.

MACHINE FOR STRAIGHTENING SAWS.

Application filed April 10, 1925. Serial No. 22,163.

This invention relates to a method and machine for straightening saws and more particularly circular saw blades.

An important object of the invention is to provide an improved method of straightening saws.

A further object of the invention is to provide an improved method whereby the blades of saws may be straightened quickly and efficiently.

Another object of the invention is to provide an improved method whereby saw blades may be efficiently straightened at a great saving in cost.

Another object of the invention is to provide means for heating and actuating a saw to straighten the blade thereof.

Another object of the invention it to provide mechanism for engaging, actuating and heating the blade so as to quickly and efficiently straighten the blade thereof.

Other objects and advantages of this invention will become apparent as the description progresses.

In the accompanying drawing forming a part of this specification and in which like numerals are employed to designate corresponding parts throughout the same:

Figure 1 is an elevational view showing a saw mounted in association with mechanism preferably employed with my improved method and machine; and Figure 2 is an enlarged vertical sectional view taken through the shaft retaining member.

In the drawing, wherein for the purpose of illustration is shown the preferred type of mechanism used in practicing the present method, the numeral 5 generally designates a longitudinal horizontally extending shaft which is rotatably mounted upon suitable bearings. The remote extremities of the shaft are supported upon end bearing blocks 6 and 7, each of these blocks being provided with journal boxes 8 upon the upper side adjacent the inner edge. The end bearing block 6 is provided on the outermost edge thereof with a thrust block 9 adapted to rotatably support the shaft and prevent axial movement thereof. The opposite end bearing block 7 carries a substantially long bearing box 10 provided with a suitable bore therethrough internally screw threaded, the purpose of which will be hereinafter more fully described.

The rotatable shaft 5 is formed of two complementary sections 11 and 12 rotatably supported adjacent their inner contacting ends by means of intermediate bearing blocks 13 carrying suitable journal boxes 14 for rotatably supporting the shaft sections in alignment. One of the shaft sections 12 carries a bearing collar 15, this collar together with the thrust block retaining the shaft section 12 securely against axial movement. This section also carries a pulley 16 by means of which the shaft construction is rotated, this pulley being adapted to receive thereon a suitable drive belt connected with any desirable source of power.

The foregoing elements while individually of conventional design are arranged to be especially useful in my saw straightening method. My improved method and machine embody additional mechanism of novel construction in the accomplishment thereof, this construction including the rotatable shaft section 11 which is adjustably mounted relative to the section 12. This adjustment is secured by an extension of the shaft 11 substantially into the journal box 10, approximately one-half the length thereof. Threadedly mounted in the opposite portion of the journal box 10 is a threaded adjusting screw 17 provided on the outer extremity with a suitable operating crank 18 for operation thereof. It is desirable that a suitable thrust bearing 19 be interposed between the adjacent ends of the adjusting screw 17 and the shaft section 11 to reduce the frictional contact thereof. From this construction it is obvious that the screw 18 may be rotated and thereby adjust the axial position of the shaft section 11, forcing this section against or away from the complementary section 12.

The adjacent extremities of the shaft sections 11 and 12 are provided with a pair of co-acting annular flanges 20 formed integral with the shaft construction or secured thereon in any suitable manner. The shaft sections 11 and 12 are retained in alignment during operative engagement by aligning mechanism including a cylindrical shaft pin 21 slidably mounted in a longitudinal bore formed in the inner extremity of the section 12, one end of the shaft pin being provided with a frusto-conical extension 22 while the other end carries a reduced extension 23. The intermediate portion of the cylindrical shaft pin 21 is provided with a longitudinal slot 24 engageable with a guide pin 25 extending through the slot and secured to the shaft section, the pin being adapted to limit longitudinal movement of the shaft pin 21. The frusto-conical extension 22 is engageable with a tapered recess 26 formed in the end of the section 11, the recess being so formed as to snugly receive the extension 22. In order that the shaft pin 21 may be firmly forced in an outwardly projected position a suitable compression spring 27 is mounted in engagement with the reduced extension 23 and the inner extremity of the shaft bore 21'. When the shaft sections 11 and 12 are in separated positions the shaft pin 21 is forced to its outermost position by means of the compression spring 27, this movement being limited by means of the guide pin 25. To bring the shaft sections in contact for operation, the handle crank 18 is rotated causing the screw shaft 17 to force the shaft section 11 axially through its bearings and against the section 12, the recess 26 formed in the end of the section 11 engaging the frusto-conical extension 22 upon the shaft pin 21 and forcing the pin partially within the bore 21'.

It is desirable in the application of my improved method to provide suitable heating means, in this instance, including a pair of oppositely-disposed burners 28 comprising gas burners connected on the extremities with suitable supply pipes 29. These heating burners and pipes are connected through suitable retaining means formed in the intermediate bearing blocks 13, being mounted therein in any suitable manner and preferably adjustable radially from the central axis of the shaft 5.

In operation, a saw designated by the numeral 30 is mounted between the shaft sections 11 and 12, this being accomplished by moving the section 11 sufficiently away from the section 12 to permit the saw blade being inserted therebetween, the central aperture of the saw being then positioned over the tapered projection of the shaft pin 21. The shaft 11 is then moved into contact with the saw by rotating the adjusting screw 11 and forcing the section 11 upon the shaft pin 21, as previously described. It is apparent from the foregoing that the saw will be firmly held between the inner extremities of the shaft sections and the shaft is then rotated at a relatively high speed. The burners 28 are ignited and the heat directed upon the blade. It is to be noted, of course, that various heating means may be employed and the device is not restricted to this particular form of heating element.

The high speed revolution of the shaft 5 and application of heat to the saw blade, will, by centrifugal force cause the heated material to flow in alignment and straighten the saw blade in comparatively short time. It is obvious that this operation will not only perform the function indicated but do so at a great saving of time and labor and materially reduce the cost of manufacture of these saws.

It is to be understood that various changes may be made in the above outlined method and in the machine construction herein described without departing from the spirit of the invention or the scope of the subjoined claims.

Having thus described my invention, I claim:

1. A device of the character described comprising a shaft formed of two complementary sections, means for rotatably supporting the sections in alignment, a saw engaging member movably mounted in one of the shaft sections engageable with a recess formed in the adjacent sections so as to prevent displacement of a saw, means formed on the adjacent ends of the shaft sections for firmly engaging a saw, and heating means comprising a pair of heat generating members mounted in spaced relation adjacent the saw body arranged to heat the body during its rotation.

2. An apparatus for straightening saws comprising a shaft formed of two complementary aligned sections supported for rotatable movement, means formed on the meeting ends of the shaft sections for detachably securing a saw therebetween, means operatively associated with the outer end of one of the shaft sections for adjustably moving the section adjacent to or away from the complementary section, and heating means comprising a pair of heat generating members supported in position adjacent the saw.

3. In an apparatus for straightening saws, the combination with a sectional shaft, means for longitudinally moving one of the sections relative to the complementary section and heating means supported adjacent the saw blade of saw engaging means including a shaft pin slidable in a longitudinal recess in one of the sections having its outer ends tapered to project in an opening in the saw and engage a recess in the end of the complementary section, and means for resiliently urging the shaft pin into extended operative position.

In testimony whereof I affix my signature.

LOUIS PARR.